May 25, 1971   A. J. NICOLIN   3,579,711
MEANS FOR ATTACHING A DETACHABLE HANDLE FOR
KITCHEN UTENSIL VESSELS
Filed July 3, 1969   3 Sheets-Sheet 1
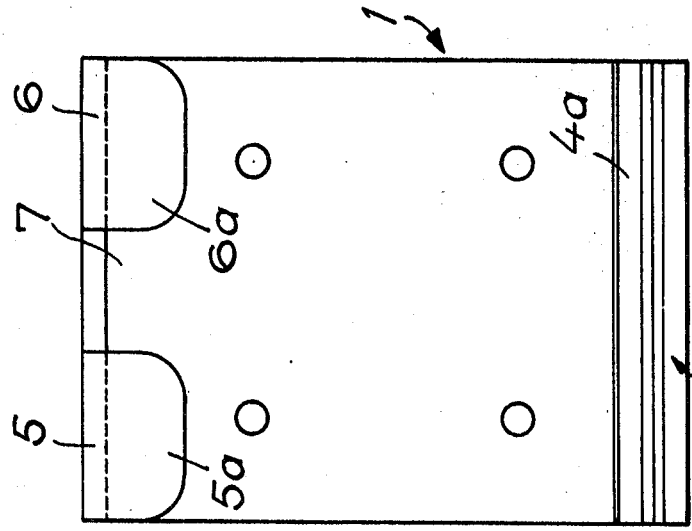
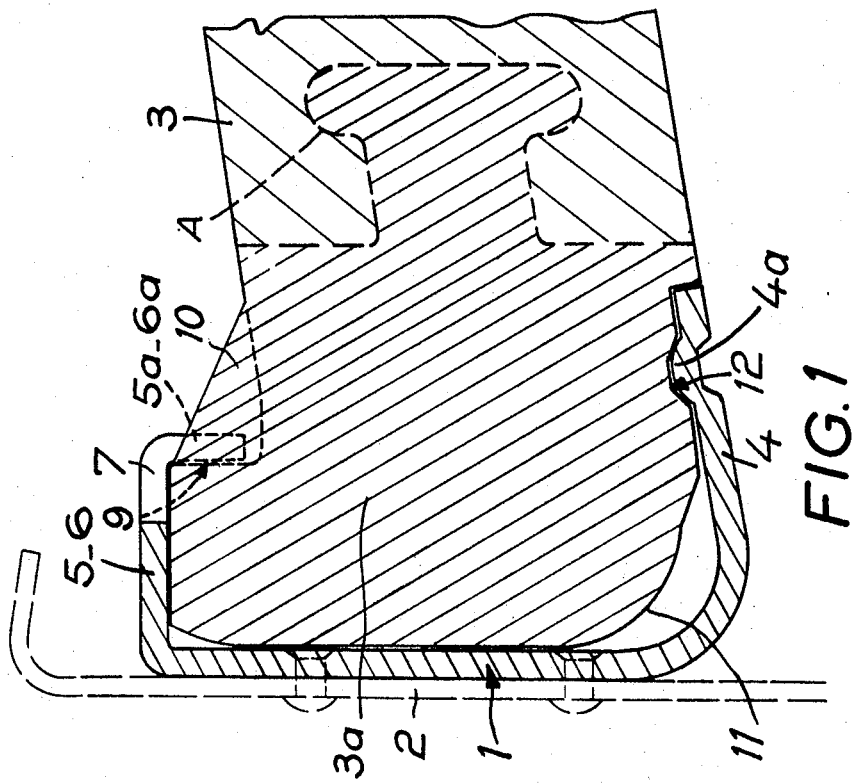

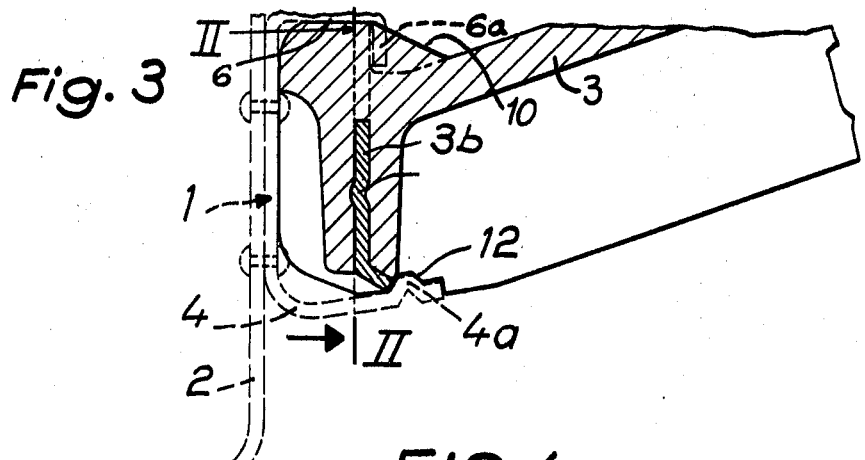
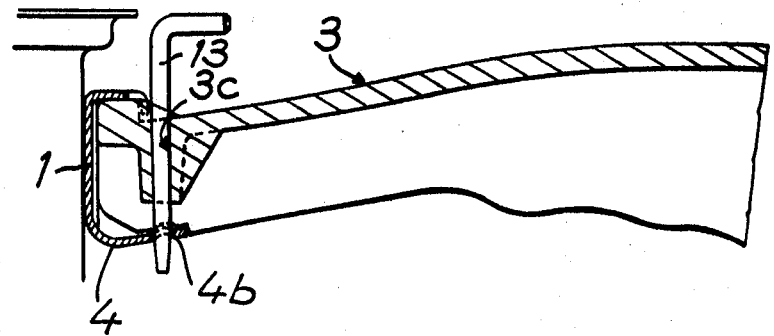
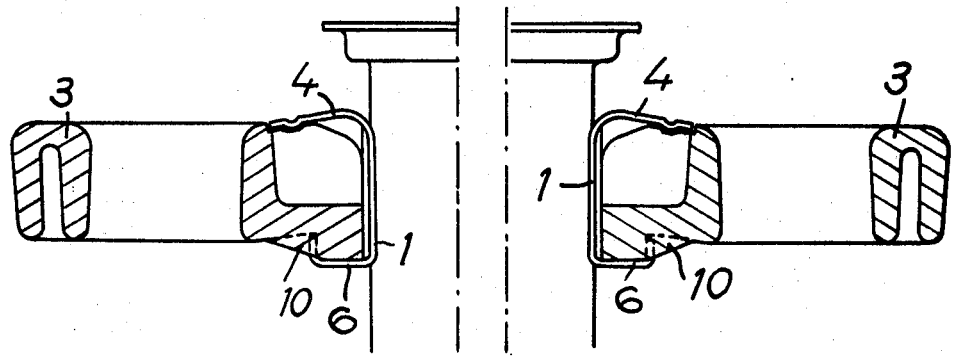

United States Patent Office

3,579,711
Patented May 25, 1971

3,579,711
MEANS FOR ATTACHING A DETACHABLE HANDLE FOR KITCHEN UTENSIL VESSELS
André J. Nicolin, Paris, France, assignor to L'Equipement par l'Acier Inoxydable (Equipinox), Paris, France
Filed July 3, 1969, Ser. No. 838,766
Claims priority, application France, July 10, 1968, 158,659; Dec. 3, 1968, 176,433
Int. Cl. A47b 45/02
U.S. Cl. 16—114
9 Claims

ABSTRACT OF THE DISCLOSURE

A support secured to the wall of a kitchen utensil vessel and housing a hook, and an arm with a locking notch in its free end arranged opposite the hook, the hook and the locking notch engaging respectively the shoulder and abutment of a detachable handle to secure the handle to the support.

---

There are already known detachable handles in the form of tongs which lock strongly on the rims of a vessel. In addition there are also detachable handles which hook on to the rim of the vessel and act as levers by resting against its wall. In all these cases the locking of the handle on the vessel is insufficient, so that during the manipulation accidental and dangerous displacements of the vessel may occur. In certain cases also the handle does not remain in position unless held by the user, and this may impose undesirable limitations.

The invention has the object of eliminating these disadvantages and of providing a new fixing for a detachable handle for kitchen utensils.

The invention provides a support suitable for utensils having only one handle, such as particularly casseroles and pans, and for utensils requiring two handles such as pots.

According to the invention the support comprises at least one part fixed to the side wall of the utensil, for example by welding. This part comprises a combination of at least one hook, the end of which is substantially parallel to the wall and intended to cooperate with a corresponding shoulder at the head of the handle, and at least one arm which is perpendicular to the wall and arranged opposite the end of the hook. This arm forms a spring and has at its free end a locking notch adapted to cooperate with a corresponding abutment on the head of the handle, arranged on the surface opposite that carrying the shoulder.

The handle is therefore capable of being engaged with its upper surface either in the rim of the vessel or in the support hook, and is secured in this position by the lower part of the support which forms the spring. However, if the handle is made of plastic material it will be advantageous to provide a metal end zone or head to avoid on the one hand wear resulting from the friction of the handle on its support, and on the other hand creeping when the handle is located in an environment having a high temperature. To this end there is provided in the head of the handle from the side opposite the sleeve, a metal fitting which extends at least partly into the zone engaging the supporting hook and into the zone making contact with the locking notch of the arm of the support.

Preferably this metal fitting is formed by a ferrule fixed in the sleeve and having the shoulder cooperating with the supporting hook, as well as a zone adapted to receive the locking notch of the support.

Other features of the invention will become apparent from the following detailed description of several embodiments thereof, shown by way of non-limiting examples in the accompanying drawings in which:

FIG. 1 is a cross-section of a removable handle for a casserole, mounted on a support according to the invention;

FIG. 2 is an end elevation of the support of FIG. 1; with the handle withdrawn;

FIG. 3 is a cross-section of a handle similar to that of FIG. 1 but provided with a reinforcing fitting;

FIG. 4 is a view similar to FIG. 1 showing another embodiment, intended particularly for pots;

FIG. 5 is a view similar to FIG. 1 showing a second embodiment of the invention, adapted particularly for pots with two handles;

Figure 6:
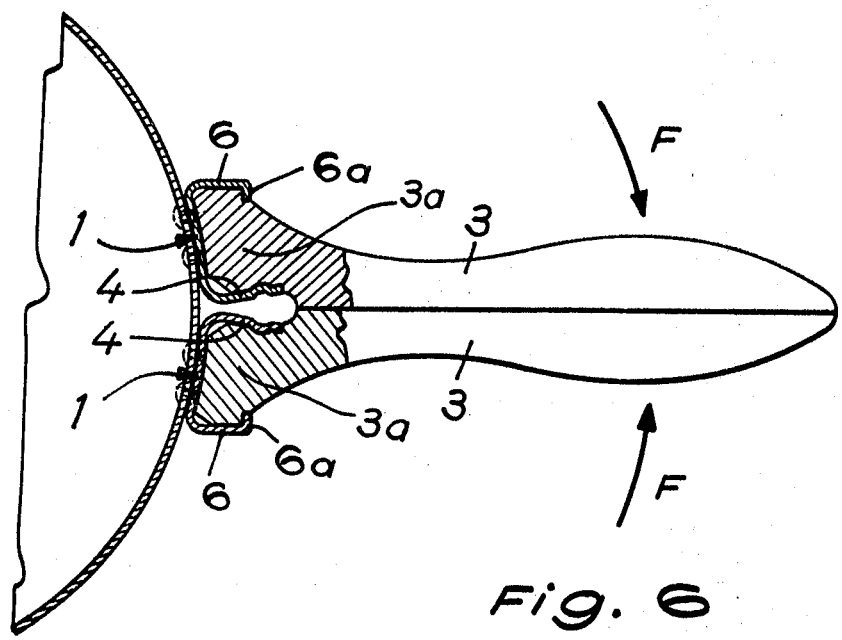
FIGS. 6 and 7 show two further embodiments suitable particularly for heavy pans or heavy utensils.

Referring now first of all to FIGS 1 and 2, these show a support for a casserole handle, consisting of a single fixed metal member, mounted on the side wall of a vessel 2, indicated by broken lines, by means of riveting or welding. In order to match the vessel better, the centre part of the member 1 has preferably the same curvature as the wall 2.

The part 1 is adapted to receive a detachable handle 3, the head of which is shown at 3a.

In its upper part, the part 1 has two hooks 5 and 6, the ends 5a and 6a of which are directed towards the bottom and substantially parallel to the wall. These two hooks are separated from each other by a slot 7. The head 3a of the handle has shoulders 9 which rest on the ends 5a and 6a of the hooks, whilst the actual head engages into the hooks.

Between the shoulders 9 is a rib 10 which engages into the slot 7 between the two hooks 5 and 6 which thereby form lateral abutments.

The lower part of the part 1 has an arm 4 extending substantially perpendicularly to the wall of the utensil. The free end of the arm has a locking notch 4a which cooperates with an abutment 12 on the lower surface of the head of the handle. Preferably, the notch 4 and the abutment 12 extend over the whole width of the part 1 as shown in the drawing.

The handle 3 may be made from any suitable material but consists preferably of synthetic resin. However, in this case the head 3a of the handle which cooperates with the support is advantageously of metal, at least in the zones of the shoulders 9 and of the locking means 12.

Preferably, and as shown in FIG. 1, the head 3a is formed by an integral metal ferrule, such as shown for example by the broken line A, and having suitable anchoring means in the sleeve of the handle. The handle may be moulded around the ferrule.

The assembly is made by presenting the handle substantially vertically with the shoulder at the bottom. The rib 10 is introduced into the slot 7 and the handle is lowered by depressing its free end, the rounded edge 11 makes contact with the locking notch 4a and pushes back the support arm 4 which yields until the notches 12 and 4a engage. The profile of the rim 11 is such that it does not make contact with the back of the end 1a, so that its deterioration is avoided.

The removable handle is then fixed and capable of holding the vessel in all positions. The force equilibrium imparts to the assembly a stability which is the greater, the greater the weight of the contents of the vessel. During the emptying, the cooperation of the rib 10 and of the two hooks 5 and 6, produced by the pressure of the arm forming a spring, prevents effectively any lateral sliding of the handle on its support, so that the handling may be carried out completely reliably and without any special attention by the user up to a complete inversion.

The handle is detached easily by reversing the assembly procedure, but it should be noted that without the user's action, the handle remains attached to the vessel.

FIG. 3 shows a modification, in which the detachable handle 3, produced of synthetic resin by moulding, comprises only a metal fitting 3b, either embedded during the moulding or inserted subsequently, for example, by means of a press.

In view of this arrangement, the supporting zones of the handle and of the support are practically non-deformable under heat and are subject to little wear due to manipulation. There is no risk of accidental disengagement, and the invention may be used to its best advantage. More particularly, owing to the positive locking action a casserole may be completely reversed.

Referring now to FIG. 4, the same shows a modification intended more particularly for a heavy pan or the like. A key 13 permits the handle to be blocked by entering into a recess 3c of the handle and a hole 4b of the arm 4. However, any other complementary blocking member may be provided, whereby the utensil may be jerked upwards without risking the unlocking.

FIG. 5 shows an embodiment adapted to be used for utensils such as pots having two handles. In this case, the part 1 is flanged over and the support comprises two parts 1 arranged symmetrically relative to the axis of the utensil. The arm 4 is located in the upper part of the part 1, whilst the lower end comprises also two hooks 6 cooperating with the shoulders 9 and the rib 10 of the head of the handle, as already described above.

Returning now to the case of frying pans (vessels for tossing) or heavy utensils, and more generally to cooking implements which are subjected to great accelerations and decelerations, reference is made to FIG. 6. It should be noted that this figure represents a plan view of the utensil.

A part 1 forming the support, comprises the same elements, hooks 5 and 6, and arm 4, as described above, but the hook and the arm are located substantially in the same horizontal plane. Under these conditions, the rib 10 of the handle ensures in cooperation with the ends 5a and 6a of the hooks, the perfect blocking of the handle on its support against any vertical movement.

However, if the support comprises only one part 1 there still might exist the danger of accidental detachment during horizontal movements. In order to overcome this, FIG. 6 shows that there are provided two parts 1 arranged side by side wherein the arms 4 are adjacent to each other, whilst the hooks are arranged on either side of the arms.

The handle consists, in fact, of two half handles 3, the heads 3a of which engage into the parts 1 in the way described above. However, the movements of the two half handles take place in a horizontal plane and no longer in a vertical plane.

When the user locks the two half handles together in the direction of the arrows F, there exists no danger of detachment without regard to the direction and acceleration of the movements of the utensil.

Figure 7:
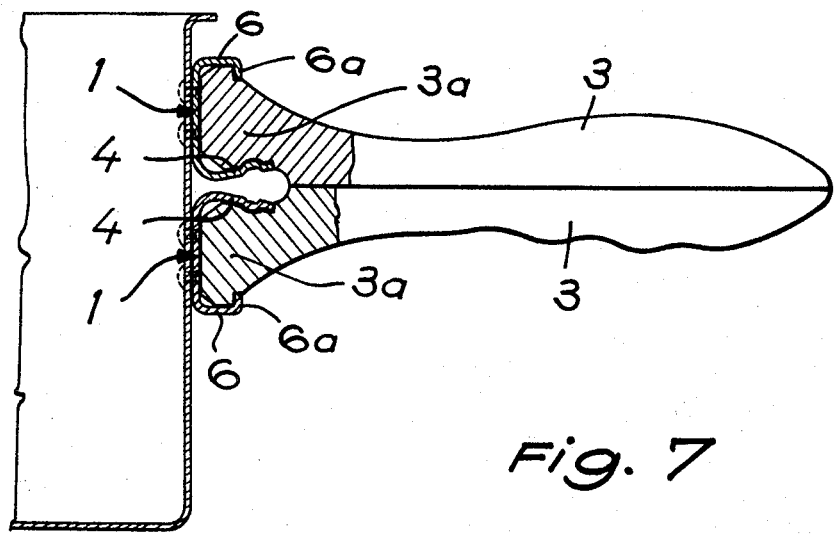

Referring finally to FIG. 7, this shows a modification similar to that just described. However, in this case a side elevation is shown and the two parts 1 forming the support for the two half handles are located one above the other. Also the arms are adjacent to each other and the hooks are located on both sides of the arms. This embodiment combines the parts 1 described in FIGS. 1 to 5 and the half handles are placed in position by rotating them in a vertical plane. When the user locks the half handles, any risk of unlocking is eliminated.

The invention is not limited to the embodiment shown and described in detail, which may be modified in many ways without departing from the principle of the invention. More particularly, the rib 10 may be arranged below the lower surface of the handle remote from the shoulder 9, and the slot 7 is then provided in the supporting arm 4. More generally, the support can be arranged so as to provide two lateral abutments which cooperate with the handle to prevent its displacement when it is turned over.

I claim:

1. A support on a kitchen utensil and a detachable handle for attachment to said support having on one side of its head a shoulder and on the other side an abutment, the said support being secured to the side wall of a vessel and comprising, in combination, hook means, the free end of which is disposed substantially parallel to the said vessel wall, and arm means extending substantially perpendicularly to the said vessel wall and arranged opposite the hook means, the said arm means having at its free end a locking notch, whereby, on insertion of the head of the detachable handle into the support the shoulder engages the hook means and the abutment engages the locking notch of the said arm means to securely attach the handle to the support.

2. A support according to claim 1, wherein there is provided lateral abutments on the hook means for engagement with the head of the detachable handle.

3. A support according to claim 1, wherein the hook means has a centre slot for engagement with a correspondingly positioned rib on the head of the handle.

4. A support according to claim 1, wherein the hook means is situated above the arm means.

5. A support according to claim 1, wherein the hook means is situated below the arm means.

6. A support according to claim 1, wherein the hook means and the arm means are situated in substantially the same horizontal plane.

7. Two supports, each according to claim 5, arranged symmetrically relative to the axis of the vessel.

8. Two supports, each according to claim 6, arranged side by side with the two arm means adjacent each other and the two hook means on the outside.

9. Two supports, each according to claim 1, arranged one above the other wherein the two arm means are adjacent to each other whilst the hook means are on the outside.

References Cited

UNITED STATES PATENTS 3,388,662    6/1968    Ravreby      16—114
1,951,656    3/1934    Haffling      16—114

FRANCIS K. ZUGEL, Primary Examiner

D. L. TROUTMAN, Assistant Examiner

U.S. Cl. X.R.

248—223